United States Patent [19]

Shrewsburg et al.

[11] Patent Number: 4,812,350

[45] Date of Patent: Mar. 14, 1989

[54] ADHESION ENHANCER FOR COVERED POLYURETHANE PANELS

[75] Inventors: James E. Shrewsburg, Southgate; Edward W. Cole, III, Wyandotte, both of Mich.

[73] Assignee: BASF Corporation, Parsippany, N.J.

[21] Appl. No.: 122,772

[22] Filed: Nov. 19, 1987

Related U.S. Application Data

[63] Continuation-in-part of Ser. No. 12,294, Feb. 9, 1987, abandoned.

[51] Int. Cl.⁴ .............................................. B32B 3/26
[52] U.S. Cl. .................................. 428/151; 428/316.6; 428/317.5; 428/319.7; 428/423.4; 428/904
[58] Field of Search ................. 428/151, 317.5, 423.4, 428/316.6, 319.7, 904

[56] References Cited

U.S. PATENT DOCUMENTS 4,353,955  10/1982  Cook ................................ 428/316.6

Primary Examiner—William J. Van Balen
Attorney, Agent, or Firm—Joseph D. Michaels

[57] ABSTRACT

Covered polyurethane foam panels have incorporated in them an adhesion enhancer which is composed of a polyester polyol and a heteric polyether polyol. The polyester polyol is preferably an adduct of adipic acid with ethylene glycol and butanediol. The heteric polyether polyol contains from about 35 weight percent to about 75 weight percent ethylene oxide, the remainder being propylene or butylene oxide and has a functionality from about 2 to about 3.

9 Claims, No Drawings

ADHESION ENHANCER FOR COVERED POLYURETHANE PANELS

This is a continuation-in-part of application Serial No. 012,294, filed February 9, 1987, now abandoned.

BACKGROUND OF THE INVENTION

1. Field of the Invention

This invention relates to covered polyurethane foam panels. More particularly the invention relates to polyurethane foam which has incorporated in it adhesion enhancers which promote the adhesion between the polyurethane foam and a covering therefor.

2. Prior Art

The current trend in the automotive industry is in the use of cast vinyl skin for instrument panels and cloth fabric in order to obtain a plush feel and expensive look. Due to the very slippery back surface of the cast skin adhesion of the polyurethane foam to the skin is important. Without proper adhesion between the cover and the polyurethane foam, separation will occur either due to heat of the sun or during heat cycle testing. Adhesion is also important between polyurethane shoe soles and the leather uppers.

U.S. Pat. No. 4,508,774 teaches that covered polyurethane foams are prepared by bonding the covering with the polyurethane foam with the aid of adhesives. U.S. Pat. No. 4,541,885 teaches dielectrically fusing a layer of polyurethane to a cover layer. The instant invention eliminates either the use of adhesives or dielectric fusion.

SUMMARY OF THE INVENTION

The subject invention relates to covered polyurethane foam wherein the polyoxyalkylene polyether polyol mixture comprises an effective amount of an adhesion enhancer comprising a polyester polyol and a heteric polyether polyol.

DESCRIPTION OF THE PREFERRED EMBODIMENTS

Polyurethane foams which have enhanced adhesion qualities to a cover material such as vinyl sheet, leather, or a woven or knit cloth fabric may be prepared by reacting (a) a polyoxyalkylene polyether polyol mixture and (b) an organic polyisocyanate wherein the polyol mixture comprises an effective amount of an adhesion enhancer. The adhesion enhancer is composed of a polyester polyol and a heteric polyoxyalkylene polyether polyol. The concentration of the adhesion enhancer is from about 0.5 weight percent to about 10 weight percent of the polyol mixture, preferably from about 1 weight percent to about 5 weight percent of the polyol mixture. The ratio of polyester polyol to the heteric polyol is from about 1:4 to about 4:1, preferably from about 1:2 to about 2:1.

The polyether polyol which is employed in combination with the polyester polyol as an adhesion enhancer contains from about 35 weight percent to about 75 weight percent ethylene oxide, the remainder is propylene or butylene oxide and has a functionality from about 2 to about 3. The adhesion enhancer also helps to improve adhesion to substrates used in instrument panel construction such as vinyl sheets. Vinyl sheets may be prepared either as extrusions or cast. Extruded vinyl is usually a two layer bonded vinyl made with an ABS, acrylonitrile-butadienestyrene, backing on a vinyl skin. These vinyl sheets are extruded onto rolls from which the appropriate size pieces are cut, the sheets are then heated and vacuum formed over the desired mold.

Cast sheets are prepared either from powdered resin or a liquid plastisol. The material is poured into a mold in such a quantity as to achieve the desired thickness. The mold is at temperatures of greater than 204° C. The materials melt, flow together and fuse to form the cast skin. Adhesion to the cast skin is more difficult due to the smooth, slick, surface area. Higher adhesion values are generally obtained with the extruded vinyl sheets than with the cast vinyl sheets. The various substrates which are employed are NORRELL, ABS, and ABS/-fiberglass filled. It also enhances adhesion to any plastic film which is often used in instrument panels. The adhesion enhancer also helps to improve adhesion to leather. Thus the invention is useful in preparing polyurethanes shoe soles which may be readily attached to the leather uppers having enhanced adhesion.

Representative polyols which may be employed in the preparation of polyurethane foams are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000, preferably from 200 to 2500.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α, β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxylcontaining polyester with only a portion of the components being a diamine such as ethylene diamine. Any polyester polyol may be employed as an adhesion enhancer, however, it is preferred that the polyester polyol is an adduct of adipic acid with ethylene glycol and butanediol.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols; poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene: aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Other polyols which may be employed have incorporated therein vinylic polymers. These polyols may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The polyols which may be employed in the preparation of the graft polymer dispersions are well known in the art. Both conventional polyols essentially free from ethylenic unsaturation such as those described in U.S. Reissue Pat. No. 28,715 and unsaturated polyols such as those described in U.S. Pat. No. 3,652,659 and U.S. Reissue Pat. No. 29,014 may be employed in preparing the graft polymer dispersions used in the instant invention, the disclosures of which are incorporated by reference.

The polyurethane foams employed in the present invention are generally prepared by the reaction of a polyoxyalkylene polyether polyol and an adhesion enhancer with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "oneshot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyl-diphenylmethane-4,4'-diisocyanate; the triisocyanates such as 4,4',4''-triphenylmethane triisocyanate, and toluene 2,4,6-triisocyanate: and the tetraisocyanates such as 4,4'-dimethyldiphenylmethane-2,2'-5,5'-tetraisocyanate and polymeric polyisocyanates such as polymethylene polyphenylene polyisocyanate. Especially preferred are toluene diisocyanate, 4,4,'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane diisocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines such as phenylene diamine, 1,4-cyclohexane-bis-(methylamine), ethylenediamine, diethylenetriamine, N-(2-hydroxypropyl)ethylenediamine, N'N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropylpropylenediamine, 3-diethylaminorpopyldiethylamine, dimethylbenzylamine, and the like. Other suitable catalysts are, for example, stannous chloride dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Adhesion Test

The covered polyurethane part is cut into a strip five inches long and one inch in width and depth. About two inches of cover are cut away from the foam line. This cut portion of foam is clamped into the lower jaws of the Instron instrument while the cover is pulled 180° C. from its original position and clamped onto the upper jaws. The upper and lower jaws are drawn apart at a rate of one inch per minute. The force required to tear the skin away from the foam is calculated as Newtons per Meter.

The following abbreviations are employed in the examples. All parts employed are parts by weight.

Polyol A is a propylene oxide ethylene oxide adduct of dipropylene glycol containing an 18 weight percent ethylene oxide cap and having a hydroxyl number of about 29.

Polyol B is a propylene oxide ethylene oxide adduct of trimethylolpropane capped with 13 weight percent ethylene oxide containing 31 weight percent ethylene oxide containing 31 weight percent of 1:1 styrene: acrylonitrile with a hydroxyl number of about 24.

Polyol C is an ethylene oxide adduct of vicinal toluenediamines having a hydroxyl number of about 450.

Polyol D is a propylene oxide ethylene oxide heteric adduct of glycerine containing about 68 percent ethylene oxide having a hydroxyl number of about 46.

Polyol E is a polyester polyol of adipic acid, butanediol and ethylene glycol having a hydroxyl number of about 56.

Polyol F is a propylene oxide ethylene oxide adduct of propylene glycol containing 20 percent ethylene oxide as a cap and having a hydroxyl number of about 26.

Isocyanate A is polymethylene polyphenylene polyisocyanate.

Isocyanate B is diphenylmethane diisocyanate reacted with dipropylene glycol and polyoxypropylene polyether polyol molecular weight of about 400.

Niax C-174 is an amine catalyst sold by Union Carbide Corp.

Polycat 77 is an amine catalyst sold by Air Products & Chemicals.

EX-678 is dispersion of carbon black pigment in a polyoxypropylene polyether polyol.

D.B.O. is 1,4 butanediol.

E.G. is ethylene glycol.

I-460 is an amine catalyst sold by Air Products & Chemicals.

T-12 is dibutytin dilaurate.

DABCO 33 LV is an amine catalyst sold by Air Products & Chemicals.

DC 193 is a silicone surfactant sold by Dow Corning.

F-11 is a fluorocarbon sold by duPont Corp.

EXAMPLES 1-24

Procedure

The blend of reactants as listed in Examples 1-24 were maintained at temperatures of about 26° C. ±2° C. Vinyl pads which were heated to a temperature of 38°-43° C. were placed into a mold and a vacuum was imposed to mold the pad into the desired shape. The reactants were blended in a multi-mix head and the resulting mixture was poured into the closed mold. After two minutes, the resulting pads were demolded. After allowing the pads to cool, appropriate samples were cut from the pads and were submitted for adhesion testing. The results are listed in the tables below. In the absence of the adhesion enhancers, the adhesion is considerably less. The pads of Examples 10–15 employed extruded vinyl. The rest of the pads employed cast vinyl.

TABLE I

| Examples | 1 | 2 | 3 |
|---|---|---|---|
| Formulation, pbw | | | |
| Polyol A | 8.5 | → | → |
| Polyol B | 10 | → | → |
| Polyol C | 3 | → | → |
| Polyol D | 1 | 1 | — |
| Polyol E | 1.7 | — | 1.7 |
| Niax C-174 | 0.3 | → | → |
| Polycat 77 | 0.25 | → | → |
| Water | 2.35 | → | → |
| EX-678 | 1.0 | → | → |
| Isocyanate A 41.4/100 parts of polyols | | | |
| Physical Property | | | |
| Adhesion, N/M | 109 | 67 | 69 |

TABLE II

| Examples | 4 | 5 | 6 | 7 | 8 | 9 |
|---|---|---|---|---|---|---|
| Formulation, pbw | | | | | | |
| Polyol A | 8.5 | → | → | → | → | → |
| Polyol B | 10 | → | → | → | → | → |
| Polyol C | 3 | → | → | → | → | → |
| Polyol D | 1 | 1 | 1 | 1 | — | — |
| Polyol E | 1.7 | 1.7 | — | — | 1.7 | 1.7 |
| Niax C-174 | 0.3 | → | → | → | → | → |
| Polycat 77 | 0.25 | → | → | → | → | → |
| Water | 2.35 | → | → | → | → | → |
| EX-678 | 1.0 | → | → | → | → | → |
| Isocyanate A 41.4/100 parts of polyols | | | | | | |
| Physical Property | | | | | | |
| Adhesion, N/M | 88 | 104 | 49 | 69 | 56 | 65 |

TABLE III

| Examples | 10 | 11 | 12 | 13 | 14 | 15 | 16 | 17 |
|---|---|---|---|---|---|---|---|---|
| Formulation, pbw | | | | | | | | |
| Polyol A | 8.5 | → | → | → | → | → | → | → |
| Polyol B | 10 | → | → | → | → | → | → | → |
| Polyol C | 3 | → | → | → | → | → | → | → |
| Polyol D | 1 | 1 | 1 | 1 | — | — | — | — |
| Polyol E | 1.7 | 1.7 | — | — | 1.7 | 1.7 | — | — |
| Niax C-174 | 0.3 | → | → | → | → | → | → | → |
| Polycat 77 | 0.25 | → | → | → | → | → | → | → |
| Water | 2.35 | → | → | → | → | → | → | → |
| EX-678 | 1.0 | → | → | → | → | → | → | → |
| Isocyanate A 41.4/100 parts of polyols | | | | | | | | |
| Physical Property | | | | | | | | |
| Adhesion, N/M | 191 | 194 | 126 | 151 | 124 | 175 | 84 | 68 |

TABLE IV

| Examples | 18 | 19 | 20 |
|---|---|---|---|
| Formulation, pbw | | | |
| Polyol A | 8.5 | → | → |
| Polyol B | 10 | → | → |
| Polyol C | 3 | → | → |
| Polyol D | 1 | 1 | — |
| Polyol E | 1.7 | — | 1.7 |
| Niax C-174 | 0.3 | → | → |
| Polycat 77 | 0.25 | → | → |
| Water | 2.35 | → | → |
| EX-678 | 1.0 | → | → |
| Isocyanate A 41.4/100 parts of polyols | | | |
| Physical Property | | | |
| Adhesion, N/M | 71 | 45 | 27 |

TABLE V

| Examples | 21 | 22 | 23 | 24 |
|---|---|---|---|---|
| Formulation, pbw | | | | |
| Polyol A | 8.5 | → | → | → |
| Polyol B | 10 | → | → | → |
| Polyol D | 1 | 1 | 1 | 1 |
| Polyol E | 1.7 | 1.7 | 1.7 | 1.7 |
| Niax C-174 | 0.3 | → | → | → |
| Polycat 77 | 0.25 | → | → | → |
| Water | 2.35 | → | → | → |
| EX-678 | 1.0 | → | → | → |
| Isocyanate A 41.4/100 parts of polyols | | | | |
| Physical Property | | | | |
| Adhesion, N/M | 200 | 133 | 97 | 87 |

EXAMPLES 25–28

The formulation listed in Table VI was maintained at a temperature of 25° C.±2° C. Upon mixing, the mixture was poured into a closed mold containing leather lying in the bottom of the mold at a temperature of about 49° C. The parts were demolded after about 3.5 minutes. After aging for one day, the adhesion was tested employing the procedure listed above.

TABLE VI

| Examples | 25 | 26 | 27 | 28 |
|---|---|---|---|---|
| Formulation, pbw | | | | |
| Polyol F | 65 | 66 | 66 | 66 |
| Polyol B | 20 | 20 | 20 | 20 |
| B.D.O. | 5.15 | 5.15 | 5.15 | 5.15 |
| E.G. | 0.20 | 0.20 | 0.20 | 0.20 |
| I-460 | 1.5 | 1.5 | 1.5 | 1.5 |
| T-12 | 0.03 | 0.03 | 0.03 | 0.03 |
| DABCO 33 LV | 0.10 | 0.10 | 0.10 | 0.10 |
| F-11 | 6.0 | 6.0 | 6.0 | 6.0 |
| Water | 0.17 | 0.17 | 0.17 | 0.17 |
| Polyol D | — | — | 0.9 | 0.9 |
| Polyol E | — | — | 1.6 | 1.6 |
| Isocyanate B | 100 Index | | | |
| Physical Property | | | | |
| Adhesion, N/M | 5600 | 5446 | 6339 | 7915 |

The embodiments of the invention in which an exclusive privilege or property is claimed are defined as follows:

1. A molded covered polyurethane foam comprising the product of
   (a) a polyoxyalkylene polyether polyol mixture wherein said polyol mixture comprises an effective amount of an adhesion enhancer,
   (b) an organic polyisocyanate,
   (c) a catalyst,
   (d) a blowing agent, and
   (e) a vinyl skin, wherein the adhesion enhancer comprises a polyester polyol of adipic acid, ethylene glycol and butanediol and an ethylene oxide propylene oxide heteric polyol having a functionality from about 2 to about 3.

2. The product of claim 1 wherein the ratio of polyester polyol to heteric polyol is from about 1: to about 2:1.

3. The product of claim 1 wherein the concentration of adhesion enhancer ranges from about 1 weight percent to about 5 weight percent of the polyol mixture.

4. A process for the preparation of a molded covered polyurethane foam comprising reacting
(a) a polyoxyalkylene polyether polyol mixture, wherein said polyol mixture comprises an effective amount of an adhesion enhancer,
(b) an organic polyisocyanate,
(c) a catalyst,
(d) a blowing agent, and
(e) in contact with a vinyl skin, wherein the adhesion enhancer comprises a polyester polyol of adipic acid, ethylene glycol and butanediol and an ethylene oxide propylene oxide heteric polyol having a functionality from about 2 to about 3.

5. The process of claim 4 wherein the ratio of polyester polyol to heteric polyol is from about 1:2 to about 2:1.

6. The process of claim 4 wherein the concentration of adhesion enhancer ranges from about 1 weight percent to about 5 weight percent of the polyol mixture.

7. A molded elastomer shoe sole and leather upper comprising the product of
(a) a polyoxyalkylene polyether polyol mixture, wherein said polyol mixture comprises an effective amount of an adhesion enhancer,
(b) an organic polyisocyanate,
(c) a catalyst,
(d) a blowing agent, and
(e) a leather upper,
wherein the adhesion enhancer comprises a polyester polyol of adipic acid, ethylene glycol and butanediol and an ethylene oxide propylene oxide heteric polyol having a functionality from about 2 to about 3.

8. The product of claim 7 wherein the ratio of polyester polyol to heteric polyol is from about 1:2 to about 2:1.

9. The product of claim 7 wherein the concentration of adhesion enhancer ranges from about 1 weight percent to about 5 weight percent of the polyol mixture.

* * * * *